United States Patent
Rodel et al.

(10) Patent No.: US 10,877,430 B2
(45) Date of Patent: Dec. 29, 2020

(54) TRACKING REMOVABLE COMPONENTS USING SECTORS

(71) Applicant: HP Indigo B.V., Amstelveen (NL)

(72) Inventors: Eduardo Rodel, Porto Alegre (BR); Humberto Cardoso Marchezi, Porto Alegre (BR); Guilherme Selau Ribeiro, Porto Alegre (BR); Marlon Gomes Lopes, Porto Alegre (BR); Josepe Franco Gerent, Porto Alegre (BR); Luciano Alves, Porto Alegre (BR); Leonardo Dias Marquezini, Porto Alegre (BR); Brian Schmitz Tani, Porto Alegre (BR)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/332,995

(22) PCT Filed: Oct. 11, 2016

(86) PCT No.: PCT/EP2016/074374
§ 371 (c)(1),
(2) Date: Mar. 13, 2019

(87) PCT Pub. No.: WO2018/068838
PCT Pub. Date: Apr. 19, 2018

(65) Prior Publication Data
US 2019/0361389 A1    Nov. 28, 2019

(51) Int. Cl.
*G08B 13/14* (2006.01)
*G03G 21/16* (2006.01)
(Continued)

(52) U.S. Cl.
CPC ..... *G03G 21/1657* (2013.01); *G03G 21/1892* (2013.01); *G06K 7/0008* (2013.01); *G06K 17/0022* (2013.01); *G06K 19/07758* (2013.01)

(58) Field of Classification Search
CPC .......... G03G 21/1657; G06K 19/0723; G06K 7/10475; A63B 2225/54
See application file for complete search history.

(56) References Cited

U.S. PATENT DOCUMENTS 6,812,838 B1 * 11/2004 Maloney ............ G06K 7/10079
340/568.1
7,737,847 B2    6/2010 Malone et al.
(Continued)

FOREIGN PATENT DOCUMENTS

FR    2886919    12/2006

OTHER PUBLICATIONS

Coop, "RFID Integrated Solutions System Optimizes Maintenance Efficiency", Boeing, Jan. 27, 2012, <http://www.boeing.com/commercial/aeromagazine/articles/2012_q1/pdfs/AERO_2012q1_article2.pdf>.
(Continued)

*Primary Examiner* — Toan N Pham
(74) *Attorney, Agent, or Firm* — International IP Law Group PLLC (57) ABSTRACT

In one example, an electromechanical device includes a removable component comprising an electronic identification tag. The apparatus also includes a plurality of tag readers disposed at a plurality of sectors in the apparatus to detect the electronic identification tag and signal strengths associated with the detected electronic identification tag, and send the signal strengths to a tracking system.

10 Claims, 7 Drawing Sheets

(51) Int. Cl.
*G03G 21/18* (2006.01)
*G06K 7/00* (2006.01)
*G06K 17/00* (2006.01)
*G06K 19/077* (2006.01)

(56) References Cited

U.S. PATENT DOCUMENTS

| | | | |
|---|---|---|---|
| 7,916,031 B2 | 3/2011 | Kothari et al. | |
| 8,384,545 B2* | 2/2013 | Hussain | G06K 7/10178 340/572.1 |
| 2003/0095278 A1 | 5/2003 | Schwartz et al. | |
| 2007/0297814 A1 | 12/2007 | Kasai | |
| 2008/0126886 A1 | 5/2008 | Elliott | |
| 2009/0256682 A1 | 10/2009 | Tu et al. | |
| 2011/0109434 A1 | 5/2011 | Hadsall | |
| 2012/0161967 A1* | 6/2012 | Stern | G06O 10/087 340/572.1 |

OTHER PUBLICATIONS

Harrison, "Lifecycle ID and Lifecycle Data Management", Dec. 14, 2006 http://cocoa.ethz.ch/downloads/2014/06/None_AUTOIDLABS-WP-BIZAPP-032.pdf >.

* cited by examiner

TRACKING REMOVABLE COMPONENTS USING SECTORS

BACKGROUND

Wireless communication such as radio-frequency identification (RFID) is used to identify and track tags attached to objects. For example, the tags may include electronically stored information associated with the objects.

BRIEF DESCRIPTION OF THE DRAWINGS

Various features of the techniques of the present application will become apparent from the following description of examples, given by way of example only, which is made with reference to the accompanying drawings, of which.

DETAILED DESCRIPTION

When electromechanical products such as industrial printers fail, technical support may try to solve a technical issue that caused the product to fail by making several attempts replacing internal components or reconnecting the internal components in other places in the electromechanical product until the technical issue is resolved. In some cases, technical support may try to fix the technical issue by replacing components based on an understanding of a root cause. However, due to time pressures, this replacement activity may be disorganized and may include several attempts to fix the technical issue by adding, replacing or removing components in the electromechanical product until the technical issue is fixed. For example, the time pressure may be related to avoiding the printer from stopping and delaying print deadlines. Accordingly, it may not possible to identify which components were actually replaced or may have been reconnected in other connector to solve a particular technical issue reported by the product user. In addition, it may not possible to get information about the life time or usage pattern until failure of component types since it may be very difficult to tell if the same physical component is still in the electromechanical product.

Some systems may use radio frequency identification (RFID) or other wireless technologies as a solution for inventory control. However, such systems may experience signal occlusion when electronic identification tags are placed in large electromechanical devices. For example, thick metals may prevent the electronic identification tags from being read by a tag reader. In addition, tag readers may experience electromagnetic interference between electromechanical products and wireless signals. For example, one or more devices in an electromechanical product may produce noise that interferes with the wireless signals.

Described herein are techniques for automatically tracking removable components in electromechanical devices using sectors. As used herein, a sector refers to a volume within an electromechanical device that is within a range of at least one tag reader. For example, the tag reader may be a radio frequency identification (RFID) reader. In some examples, an electromechanical device may be organized into a number of sectors. Each sector may be monitored using at least one strategically placed tag reader. In some examples, a report may be generated and sent to another system to process and store the information in the report. The information can later be used for a variety of applications. For example, the techniques described herein may facilitate root cause, failure, failure detection and prediction, among other potential uses. For example, the present techniques may enable prediction that uses the data collected herein to anticipate fail events before they happen. In addition, the techniques described herein can be used to avoid signal occlusion via strategic placement of the tag readers. Furthermore, the techniques avoid electromagnetic interference between electromechanical devices and wireless signals by detecting the electronic identification tags during a semi-powered state in which power is provided to the tag readers but not to other parts of the electromechanical device.

Figure 1A:
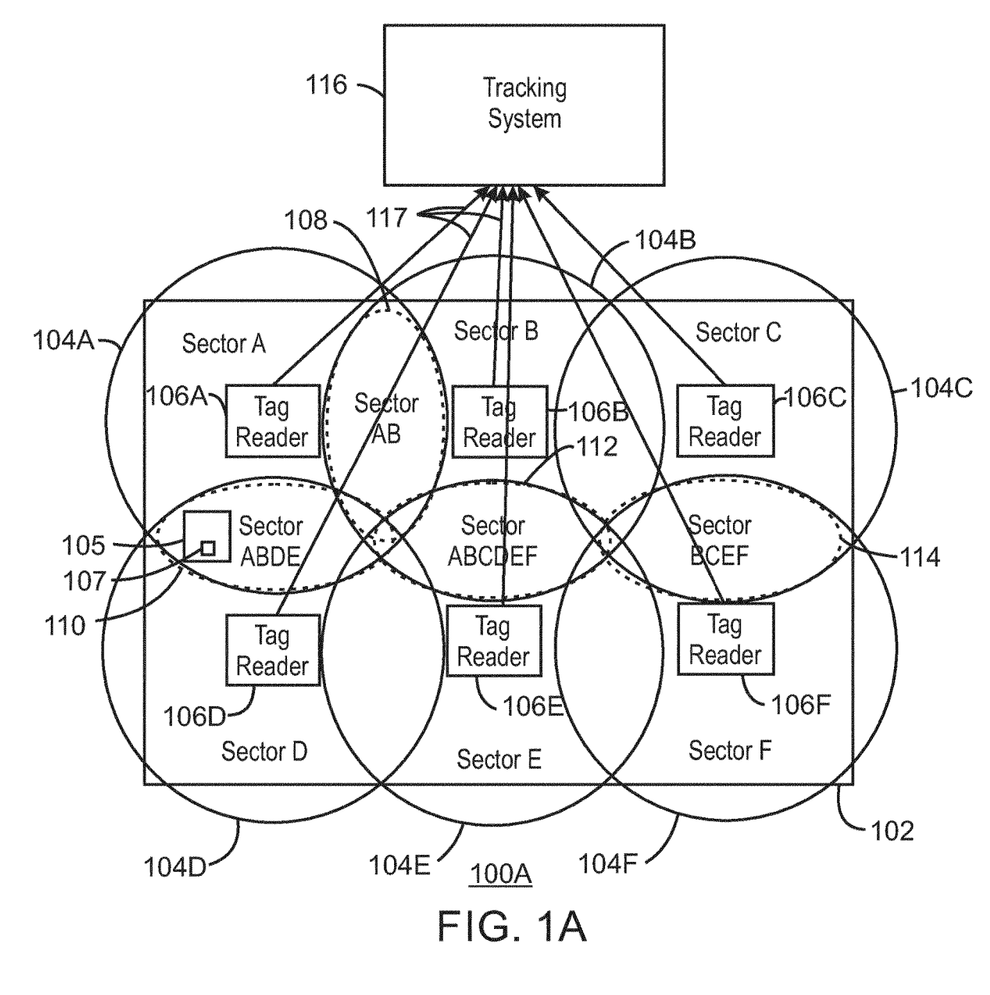
FIG. 1A is a block diagram of an example system for tracking removable components in an electromechanical device.

FIG. 1A is a block diagram of an example system for tracking removable components in an electromechanical device. The example system is generally referred to by the reference number 100A.

The system 100A includes an electromechanical device 102 with number of sectors 104A-104F and a removable component 105 that can be detected by associated tag readers 106A-106F. The removable component 105 may include an electronic identification tag 107 that can be detected and read by the tag readers 106A-106F. In some examples, the electromechanical device 102 can be a printer, fax machine, scanner, copier, etc. In some examples, the tag readers 106A-106F may be RFID tag readers, Bluetooth readers, or any other suitable tag reader. Although shown evenly spaced in a two dimensional block diagram for ease of understanding, in some examples the tag readers 106A-106F may be also be strategically arranged based on the location of removable components in the electromechanical device 102. Thus, the tag readers 106A-106F may also be placed at varying depths (not shown). In some examples, the tag readers 106A-106F and electronic identification tags (not shown) may be strategically placed to avoid signal occlusion. For example, each tag reader 106A-106F may be disposed in the electromechanical device 102 such that there is no occluding objects between the tag reader and any electronic identification tags within its sector. For example, such occluding objects may include metals. The system 100A also include sectors 108, 110, 112, 114, in which the electronic identification tag 107 of a removable component 105 may be detected by two or more tag readers. In some examples, the electronic identification tag 107 may be a passive RFID tag with an identification indicator, a part number, a manufacturing lot, and a manufacturing date. As used herein, an identification indicator refers to a unique identifier for each removable component. For example, the identification indicator may be an identification number, an alpha-numeric value (which may include symbols), a unique identification, a unique identification number, etc. For example, an electronic identification tag 107 in sector 108 (not shown) may be detected by both tag readers 106A and 106B. Similarly, an electronic identification tag 107 at sector 110 may be detected by tag readers 106A, 106B, 106D, and 106E. An electronic identification tag 107 (not shown) at sector 112 may be detectable by tag readers 106A, 106B, 106C, 106D, 106E, and 106F. An electronic identification tag 107 at sector 114 (not shown) may be detected by tag readers 106B, 106C, 106E, and 106F. The system 100A further includes a tracking system 116 to receive information from tag readers 106A-106F as shown by arrows 117.

In the example system 100A, the tag readers 106A, 106B, 106D, and 106E may detect the electronic identification tag 107. Each tag reader 106A, 106B, 106D, and 106E may also detect a corresponding signal level from the electronic identification tag 107. In some example, the tag readers 106A, 106B, 106D, and 106E may detect the electronic identification tag 107 and corresponding signal levels when the electromechanical device 102 is in a semi-powered state. For example, the electromechanical device 102 may have been shut down, serviced, and turned back on in a semi-powered state in which the tag readers 106A-106F are powered, but other functionality in the electromechanical device 102 is not powered. Thus, electromagnetic interference (EMI) from electromagnetic parts in the electromechanical device 102 may be reduced in the semi-powered state.

The block diagram of FIG. 1A is not intended to indicate that the example system 100A is to include all of the components shown in FIG. 1A. Further, the system 100A may include any number of additional components not shown in FIG. 1A, depending on the details of the specific implementation.

Figure 1B:
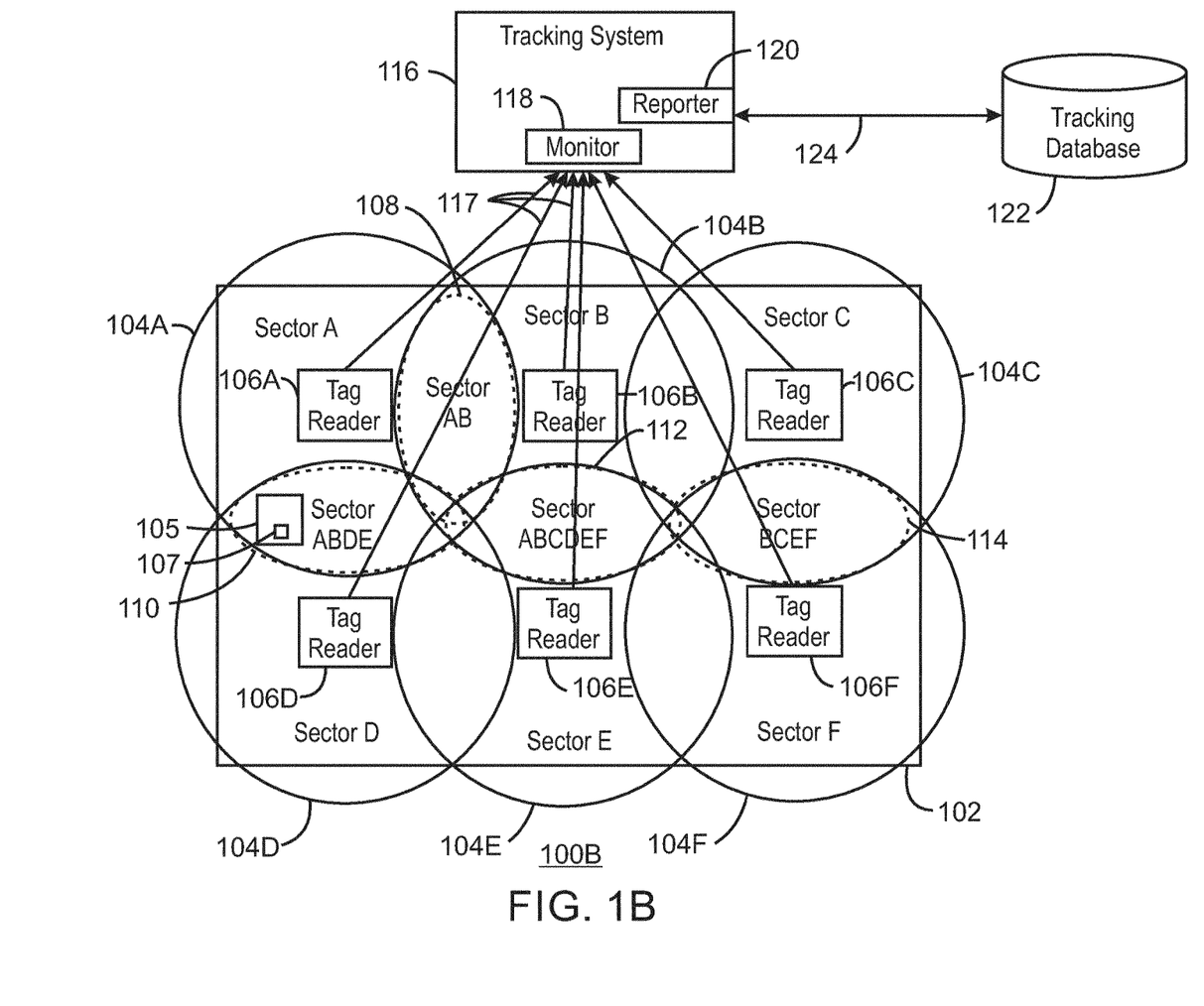
FIG. 1B is a block diagram of another example system for tracking removable components in an electromechanical device.

FIG. 1B is a block diagram of another example system for tracking removable components in an electromechanical device. The example system is generally referred to by the reference number 100B.

The system 100B includes similarly numbered elements from system 100A. In addition, the tracking system 116 includes a monitor 118 and a reporter 120. The tracking system 116 is communicatively coupled to a tracking database 122 via a connection 124. For example, the connection 124 may be a wireless connection, fiber optic connection, cable connection, or a digital subscriber line (DSL), satellite, or any other suitable communication connection. In some examples, the tracking database 122 may be located at a remote server connected to the tracking system 116 via the connection 124.

In the example system 100B, the plurality of tag readers 106A-106F are shown transmitting information via connections 126 to the monitor 118 of the tracking system 116. In some examples, the tracking system 116 may be a module physically located within the electromechanical device 102. The monitor 118 may monitor presence of at least one removable component 105 in the electromechanical device 102 based on detected electronic identification tag 107. For example, each electronic identification tag may include an identification number or identification indicator, a part number, a manufacturing lot number, or a manufacturing date, among other information. In some examples, the monitor 118 can determine a sector 110 associated with the removable component 105 based on a detected signal strength associated with the electronic identification tag 107 by at least one of the plurality of tag readers. For instance, the sector 110 can be used to identify the location of a removable component 105 as described in greater detail with respect to FIG. 3 below. In certain examples, the reporter 120 may generate a report including a notation of a sector 110 associated with the removable component 105 and an identification indicator associated with the removable component 105 and send the report to a server. In some examples, removable component additions may generate new records with full part information. For example, a new record may include an identification indicator, part number, manufacturing lot, manufacturing date, and the sector where the part is physically located. In the case of component removals, the server may flag existing respective records as removed. Similarly, a replacement of a component may be handled as a component addition record that also refers to a removal record with the same part number and sector as the part being added. In some examples, for each record update, except for the prior removal records, the last update date time may be updated with a current timestamp. Thus, a record may be kept for tracking removable components as they are used in different electromechanical devices.

The block diagram of FIG. 1B is not intended to indicate that the example system 100B is to include all of the components shown in FIG. 1B. Further, the system 100B may include any number of additional components not shown in FIG. 1B, depending on the details of the specific implementation.

Figure 2:
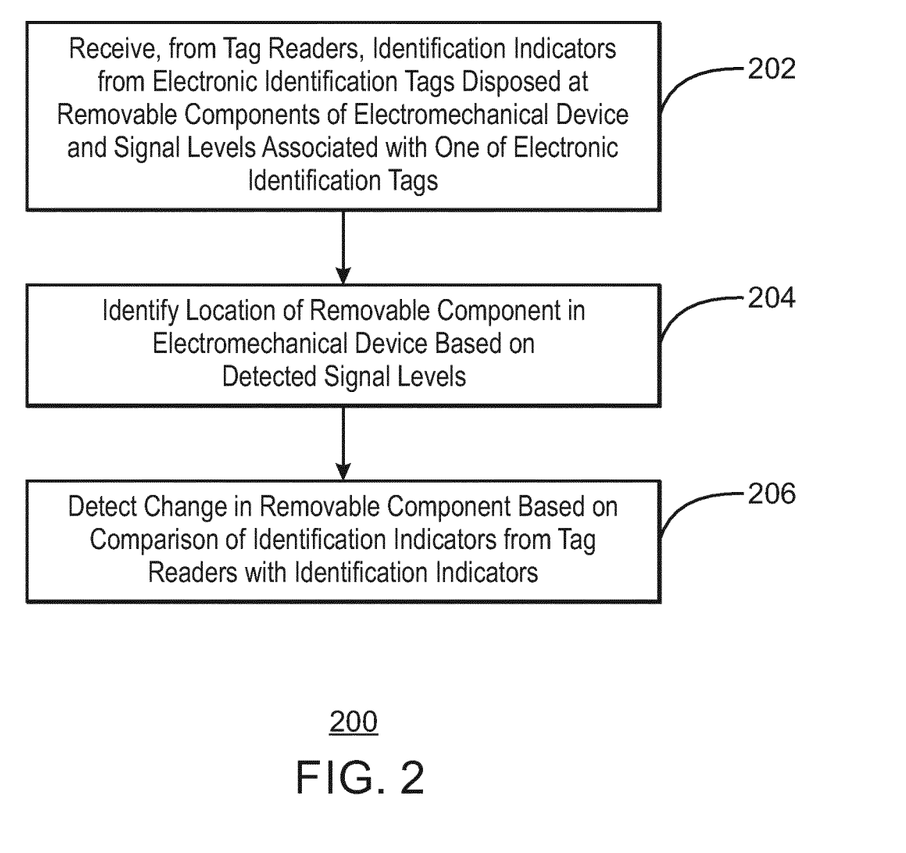
FIG. 2 is a process flow diagram illustrating an example method for tracking removable components in an electromechanical device.

FIG. 2 is a process flow diagram illustrating an example method for tracking removable components in an electromechanical device. The method of FIG. 2 is generally referred to by the reference number 200 and can be implemented in the tracking system of FIGS. 1A and 1B above or the computing device 502 below. For example, the method may be implemented using processor 504.

At block 202, a tracking system receives, from a plurality of tag readers, identification indicators from electronic identification tags disposed at removable components of an electromechanical device and signal levels associated with one of the electronic identification tags. For example, number of tag readers may be disposed at a plurality of predetermined sectors in the electromechanical device. In some examples, the tag readers may read the identification indicators when the electromechanical device is in a semi-powered operating state wherein the apparatus is powered on and the electromechanical device is otherwise powered off. For example, the electromechanical device may be turned off, a removable component maintenance may be performed, and the electromechanical device may be turned back on in the semi-powered state. In performing maintenance, if there is a previous component to be removed or replaced, then the removable component may be removed and placed away from the range of the tag readers. In some examples, the electronic identification tags and the plurality of tag readers may be disposed such that signal occlusion may be avoided. For example, the electronic identification tags and tag readers may be disposed such that no metals or other occluding objects may occlude a signal between an electronic identification tag and a tag reader. In some examples, the tracking system may detect signal levels from the identification tag when the electromechanical device is in a semi-powered state. For example, the tag readers and tracking system may be powered on and the electromechanical device may be otherwise powered off.

At block 204, the tracking system identifies a location of a removable component in the electromechanical device based on the detected signal levels. For example, the tracking system may identify the location of the removable component based on a detected sector for the removable component according to the example method 300 described in FIG. 3 below.

At block 206, the tracking system detects a change in the removable component based on a comparison of identification indicators from the plurality of tag readers with identification indicators from a database. For example, the tracking system can collect identification indicators associated with the removable components in the electromechanical device and receive a plurality of identification numbers from the database. The tracking system can then detect a change associated with the removable component according to the example method described in FIG. 4 below.

It is to be understood that the process diagram of FIG. 2 is not intended to indicate that all of the elements of the method 200 are to be included in every case. Further, any number of additional elements not shown in FIG. 2 may be included in the method 200, depending on the details of the specific implementation. For example, the method may include storing the location and the detected change and updating a time stamp on the database to indicate a time and date of last maintenance performed on the electromechanical device. The location and detected change may be stored in a database used for tracking the removable component.

Figure 3:
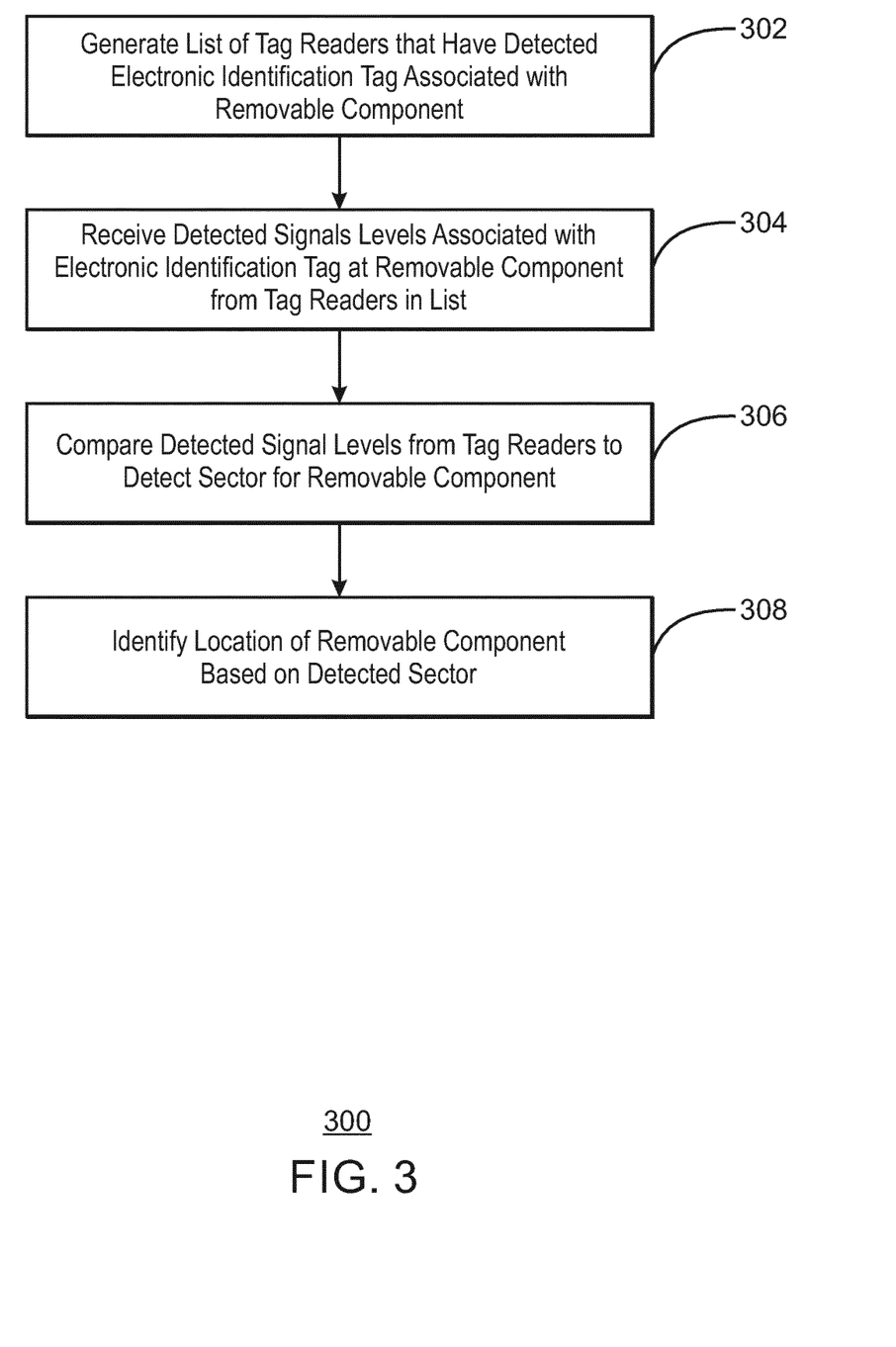
FIG. 3 is a process flow diagram illustrating an example method for identifying a location of a removable component in an electromechanical device.

FIG. 3 is a process flow diagram illustrating an example method for identifying a location of a removable component in an electromechanical device. The method of FIG. 3 is generally referred to by the reference number 300 and can be implemented in the tracking system of FIGS. 1A and 1B above or the computing device 502 below. For example, the method may be implemented using processor 504.

At block 302, the processor generates a list of tag readers that have detected an electronic identification tag associated with a removable component. For example, tag readers that have not detected any removable component may be excluded from the list.

At block 304, the processor receives detected signal levels associated with the electronic identification tag at the removable component from the tag readers in the list. For example, a higher signal level may indicate that the removable component is closer to a corresponding tag reader.

At block 306, the processor compares detected signal levels from the tag readers in the list to determine a sector for the removable component. For example, the stronger a detect signal level, the closer the removable part may be to the tag reader. In some examples, the sector may be a single sector. For example, the single sector may be within range of a single tag reader. Thus, an electronic identification tag that is read by a single tag reader may be said to belong to a single sector. In some examples, the sector may be a mixed sector. For example, the mixed sector may be a composition of two or more single sectors in which the electronic identification tag is detected. Likewise, an electronic identification tag that is read by two or more tag readers may be said to belong to a mixed sector.

In some examples, an electronic identification tag that belongs to two or more mixed sectors may be assigned to the mixed sector with higher signal strength in the majority of its associated tag readers. Thus, for example, if an electronic tag is associated with mixed sectors ABCD and CDEF, but mixed sector CDEF detects much higher signal levels among tag readers C, D, E, and F, then the electronic identification tag and its corresponding removable component may be associated with mixed sector CDEF.

At block 308, the processor identifies a location of the removable component based on the detected sector. For example, each electromechanical device may have a number of sectors defined by design. Thus, the processor may look up a sector for a particular electromechanical device to identify the location of the removable component.

It is to be understood that the process diagram of FIG. 3 is not intended to indicate that all of the elements of the method 300 are to be included in every case. Further, any number of additional elements not shown in FIG. 3 may be included in the method 300, depending on the details of the specific implementation.

Figure 4:
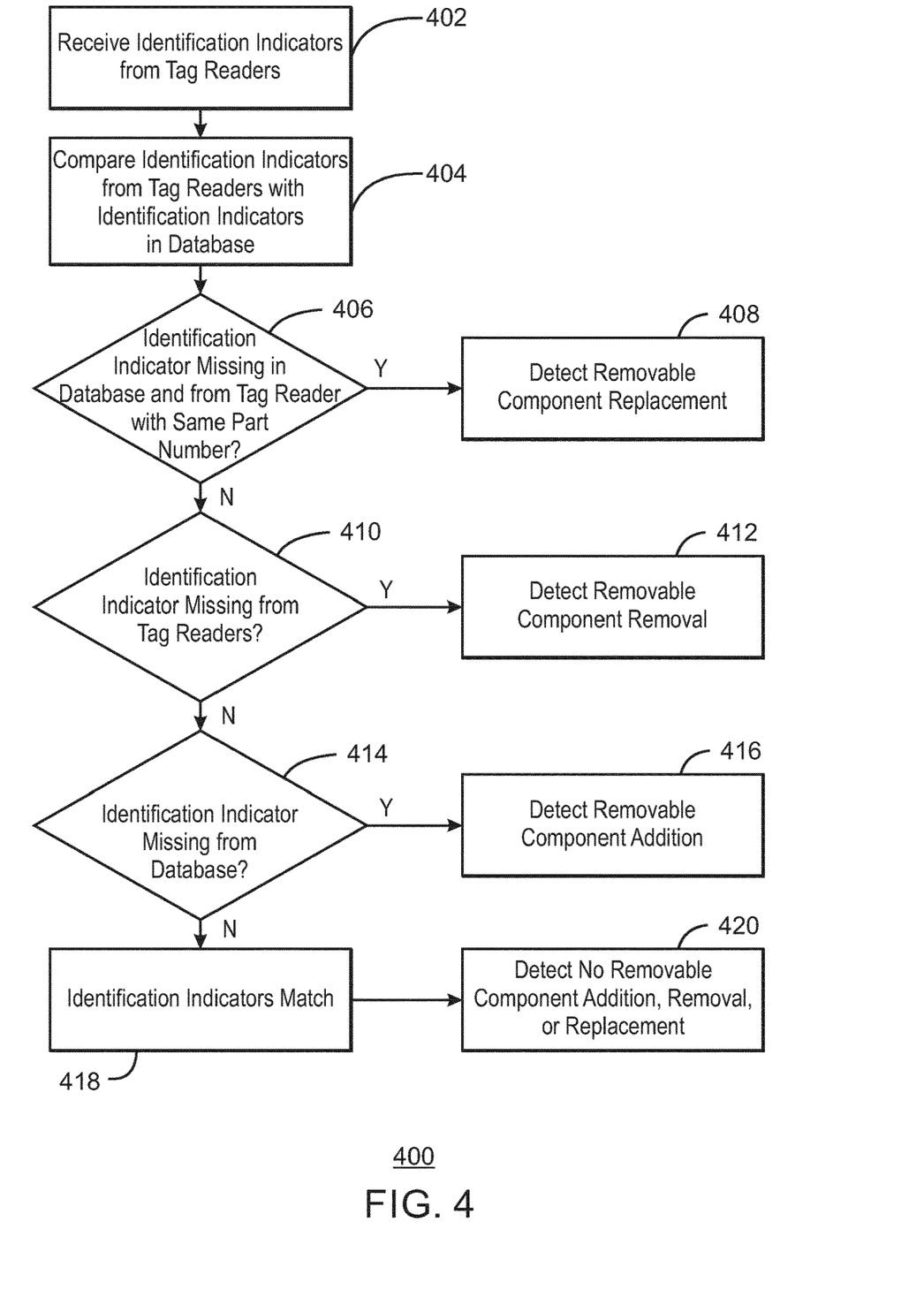
FIG. 4 is a process flow diagram illustrating an example method for detecting removable component changes.

FIG. 4 is a process flow diagram illustrating an example method for detecting removable component changes. The method of FIG. 4 is generally referred to by the reference number 400 and can be implemented in the tracking system of FIGS. 1A and 1B above or the computing device 502 below. For example, the method may be implemented using processor 504.

At block 402, a processor receives identification indicators from a number of tag readers. For example, each tag reader may provide one or more identification indicators associated with removable components.

At block 404, the processor compares the identification indicators from the tag readers with identification indicators in a database. For example, the processor may compare the identification indicators from the tag readers with a list of identification indicators associated with the electromechanical device in the database.

At diamond 406, the processor determines whether an identification indicator missing in database and another identification indicator is missing from a tag reader with a same part number. For example, electronic identification tags for removable components may have a part number corresponding to the type of part for each removable component. Matching part numbers may indicate that removable components can be replaced with one another. If the processor detects that the identification indicators with the same part number are missing, then the method may proceed at block 408. If the processor detects that identification indicators with the same part number are not missing, then the method may proceed at diamond 410.

At block 408, the processor detects a removable component replacement. For example, a removable component with the same part number but a different identification indicator may have replaced a previous removable component that was stored in the database. Thus, the part numbers of the removable components may match, but the identification indicators may be different. In some examples, the locations of the replaced removable component and the replacement removable component may be compared to confirm the detected removable component replacement.

At diamond 410, the processor determines whether an identification indicator is missing from the tag readers. For example, the processor may compare the set of identification indicators from the tag readers against the identification indicators from the database, and determine whether any identification indicators in from the database record for the electromechanical device are not present in the identification indicators from the tag readers. If the processor detects that the identification indicator is missing from the tag readers, then the method may proceed at block 412. If the processor detects that the identification indicator is not missing from the tag readers, then the method may proceed at diamond 414.

At block 412, the processor the processor detects a removable component removal. For example, a removable component such as an ink cartridge or a toner drum may have been displaced outside the range of any of the tag readers during a maintenance procedure.

At diamond 414, the processor determines whether an identification indicator is missing in database. For example, the processor may compare the identification indicators from the tag readers and the identification indicators in the database and determine whether there is an identification indicator from the tag readers missing in the database record for the electromechanical device. If the processor detects that the identification indicator is missing in the database, then the method may proceed at block 412. If the processor detects that the identification indicator is not missing in the database, then the method may proceed at block 418.

At block 416, the processor detects a removable component addition. For example, a new component may have been introduced into the electromechanical device, such as a new cartridge or a new drum. Thus, the introduction of the new removable component with a new identification indicator on its associated electronic identification tag may be detected as a removable component addition.

At block 418, the processor detects that the identification indicators from the tag readers match with the identification indicators in the database. For example, all the identification indicators received from the tag readers may match the identification indicators present in the database record for the electromechanical device. If the processor detects that the identification indicators match, then the method may proceed to block 408. If the identification indicators do not match, then the method may proceed at diamond 410.

At block 420, the processor detects no removable component addition, removable component removal, or removable component replacement in response to detecting that the identification indicators match. For example, a maintenance of an electromechanical device may have been performed without replacing, removing, or adding any removable parts. In some examples, the processor may update a time stamp on the database to indicate a time and date of last maintenance performed on the electromechanical device.

It is to be understood that the process diagram of FIG. 4 is not intended to indicate that all of the elements of the method 400 are to be included in every case. Further, any number of additional elements not shown in FIG. 4 may be included in the method 400, depending on the details of the specific implementation.

Figure 5:
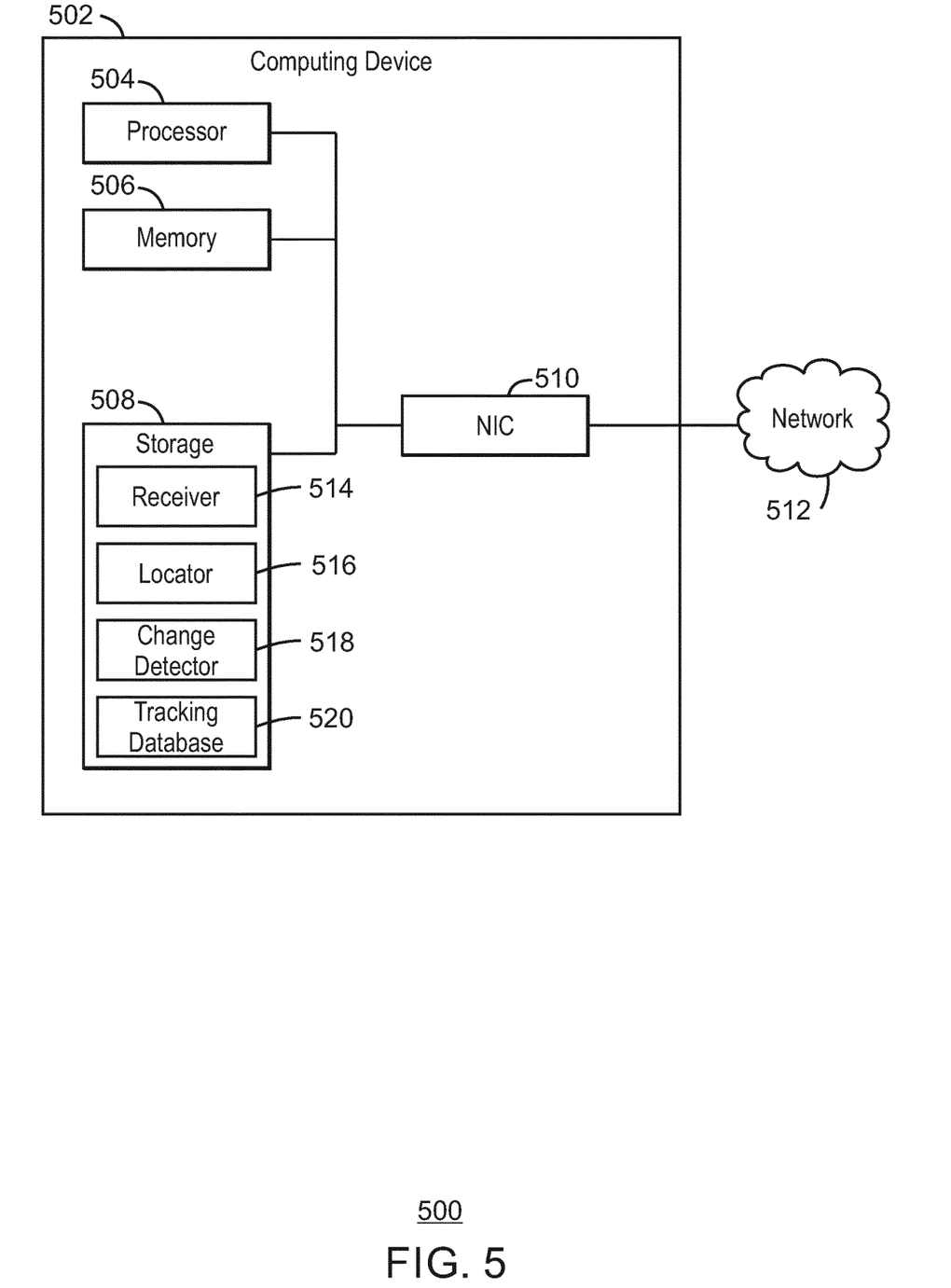
FIG. 5 is block diagram of an example computing device to track removable components using sectors.

FIG. 5 is a block diagram of an example computing device 502 to track removable components using sectors. The computing device 502 may include a processor 504, memory 506, a machine-readable storage 508, and a network interface 510 to connect computing system 502 to network 512. For example, the network interface 510 can be a network interface card (NIC).

In some examples, the processor 504 may be a main processor that is adapted to execute the stored instructions. Moreover, more than one processor 504 may be employed. Further, the processor 504 may be a single core processor, a multi-core processor, a computing cluster, or any number of other configurations. The processor 504 may be implemented as Complex Instruction Set Computer (CISC) or Reduced Instruction Set Computer (RISC) processors, x86 Instruction set compatible processors, ARMv7 Instruction set compatible processors, multi-core, or any other microprocessor or central processing unit (CPU).

The memory 106 may be one or more memory devices. The memory 106 may be volatile memory or nonvolatile memory. In some examples, the memory 506 may include random access memory (RAM), cache, read only memory (ROM), flash memory, and other memory systems.

The storage 508 is machine-readable storage and may include volatile and nonvolatile memory. In some examples, the machine-readable storage 508 may be electronic, magnetic, optical, or other physical storage device that stores executable instructions (e.g., code, logic). Thus, the machine-readable storage 508 medium may be, for example, RAM, an Electrically-Erasable Programmable Read-Only Memory (EEPROM), a storage drive such as a hard drive or solid state drive (SSD), an optical disc, and the like. The storage 508 may also include storage or memory external to the computing device 502. Moreover, as described below, the machine-readable storage medium 508 may be encoded with executable instructions (e.g., executed by the one or more processors 504) for prioritizing data. For example, the machine-readable storage medium 508 may be encoded with executable instructions for tracking removable components using sectors.

In some examples, a network interface 510 (e.g., a network interface card or NIC) may couple the computing system 502 to a network 512. For example, the network interface 510 may connect computing system 502 to a local network 512, a virtual private network (VPN), or the Internet. In some examples, the network interface 510 may include an Ethernet controller.

The computing device 502 may also include a receiver 514, a locator 516, and a change detector 518. The receiver 514 may receive a plurality of identification indicators and signal levels corresponding to removable components in an electromechanical device. The locator 516 can identify a location of a removable component based on the signal levels corresponding to the removable component. For example, the locator 516 may identify the location of a removable component based on a detected sector as described in greater detail with respect to the method 300 of FIG. 3 above. The change detector 518 can compare the identification indicators with a plurality of identification indicators in a database and detect a removable component change in the electromechanical device based on the comparison. For example, the change detector 518 may detect a removable component removal in response to detecting that the database contains an additional identification indicator with a different associated part number than the received plurality of identification indicators. In some examples, the change detector 518 can detect a removable component addition in response to detecting that an identification indicator from the electromechanical device is missing in the database. In some examples, the change detector 518 can detect a removable component replacement in response to detecting that one of the plurality of identification indicators from the electromechanical device is missing in the database and a part number associated with the missing identification indicator matches a part number of a received identification indicator.

The receiver 514, locator 516, and change detector 519 may be instructions (e.g., code, logic, etc.) store in the machine-readable storage 508 and executed by the processor 504 or other processor to direct the computing device 500 to implement the aforementioned actions. An application-specific integrated circuit (ASIC) may also be employed. In other words, one or more ASICs may be customized for the aforementioned actions implemented via the receiver 514, locator 516, and change detector 519.

The storage 508 may include a tracking database 520. For example, the tracking database 520 may store identified locations of removable parts and detected changes in the removable parts of electromechanical devices. In some examples, each electromechanical device may have separate record including a list of identification indicators corresponding to removable components present in the electromechanical device and a time stamp indicating the last maintenance performed on the electromechanical device.

The record may also include detected changes in removable parts with time stamps of when those changes were detected.

The block diagram of FIG. 5 is not intended to indicate that the computing device 502 is to include all of the components shown in FIG. 5. For example, the locator 516 and the detector 518 may instead be implemented in an electromechanical device and the receiver 514 may receive output from the locator 516 and the detector 518. Further, the computing device 502 may include any number of additional components not shown in FIG. 5, depending on the details of the specific implementation.

Figure 6:
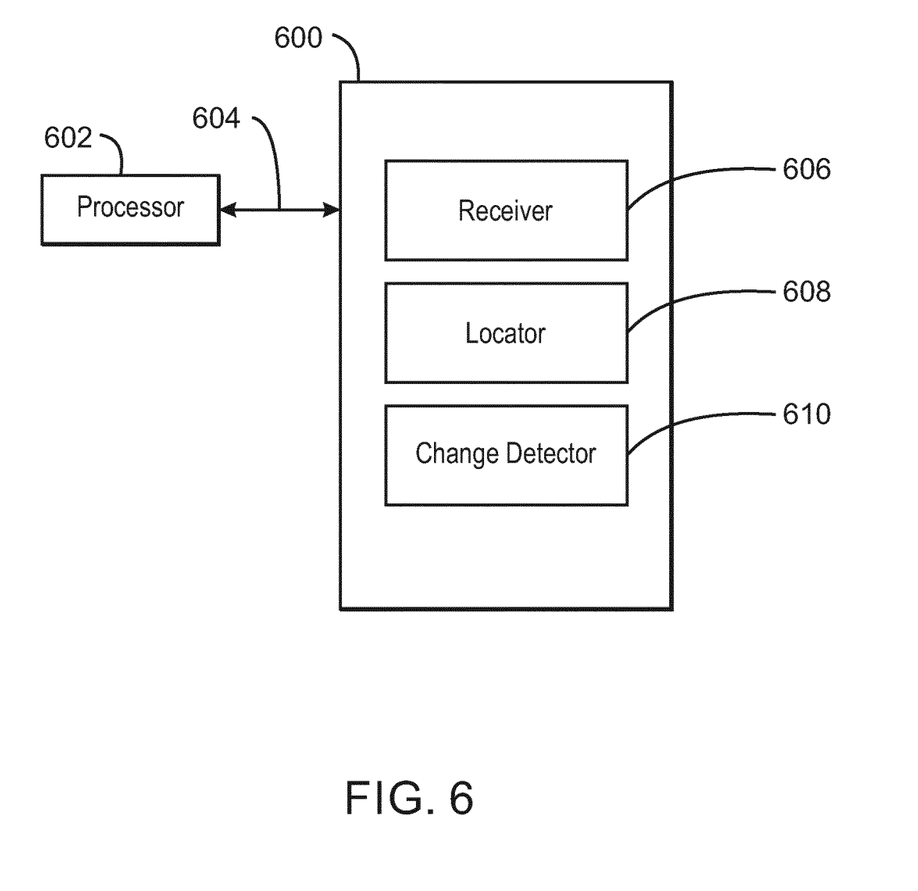
FIG. 6 is a drawing of an example machine-readable storage medium that can be used to track removable components using sectors.

FIG. 6 is a block diagram showing a tangible, non-transitory, machine-readable storage medium that stores code to direct a processor to track removable components using sectors. The machine-readable medium is generally referred to by the reference number 600. The machine-readable medium 600 can include RAM, a hard disk drive, an array of hard disk drives, an optical drive, an array of optical drives, a non-volatile memory, a flash drive, a digital versatile disk (DVD), or a compact disk (CD), among others. The machine-readable storage medium 600 may be accessed by a processor 602 over a bus 604. The processor 602 may be a processor of a computing device, such as the processor 504 of FIG. 5. In some examples, the processor 602 may be a field-programmable gate array (FPGA) processor and/or an ASIC processor. Furthermore, as indicated, the machine-readable medium 600 may include code configured to perform the methods and techniques described herein. Indeed, the various logic components discussed herein may be stored on the machine-readable medium 600. Portions 506, 508, and 510 of the machine-readable storage medium 600 can include receiver code, locator code, and change detector code, respectively, which may be executable code (machine readable instructions) that direct a processor or controller in performing the techniques discussed with respect to the preceding figures.

Indeed, the various logic (e.g., instructions, code) components discussed herein may be stored on the tangible, non-transitory machine-readable medium 600 as indicated in FIG. 6. For example, the machine-readable medium 600 may include the receiver code 606 that when executed by a processor to direct the processor or a computing device to receive a plurality of identification indicators and signal levels corresponding to removable components in an electromechanical device. For example, the signal levels may be detected by one or more tag readers for each electronic identification tag associated with a removable component. The machine-readable medium 600 may also include locator code 608 that when executed by a processor to direct the processor or a computing device to identify a location of a removable component based on the signal levels corresponding to the removable component. For example, to identify the location may include to generate a list of tag readers that detected the electronic identification tag associated with the removable component. Further, to identify the location may also include to receive the detected signal levels associated with the electronic identification tag at the removable component from the tag readers in the list, compare the detected signal levels from the tag readers to detect a sector for the removable component, and identify the location of the removable component based on the detected sector. The machine-readable medium 600 may further include change detector code 410 that when executed by a processor to direct the processor or a computing device to compare the identification indicators with a plurality of identification indicators in a database, and to detect a removable component change in the electromechanical device based on the comparison. For example, to detect a removable component change can be to detect a removable component removal in response to detecting that the database contains an additional identification indicator with a different associated part number than the received plurality of identification indicators. In some examples, to detect a removable component change can be to detect a removable component addition in response to detecting that an identification indicator from the electromechanical device is missing in the database. In some examples, to detect a removable component change can be to detect a removable component replacement in response to detecting that one of the plurality of identification indicators from the electromechanical device is missing in the database and a part number associated with the missing identification indicator matches a part number of a received identification indicator.

Although shown as contiguous blocks, the logic components may be stored in any order or configuration. For example, if the machine-readable medium 600 is a hard drive, the logic components may be stored in non-contiguous, or even overlapping, sectors.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. An electromechanical device, comprising:
   a removable component comprising an electronic identification tag, the electronic identification tag including an identification indicator;
   a plurality of tag readers disposed at a plurality of sectors in the electromechanical device to detect the electronic identification tag and signal strengths associated with the electronic identification tag, and send the electronic identification indicator and the signal strengths to a tracking system; and
   the tracking system, to
      receive, from the plurality of tag readers, the identification indicator and the signal strengths;
      identify a location of the removable component in the electromechanical device based on the signal strengths;
      detect a change in the removable component based on a comparison of the identification indicator with identification indicators from a database, wherein to detect the change includes at least one from the set of
         detect removable component replacement in response to detecting that the identification indicator from the tag readers is missing in the database, and an identification indicator from the database is missing from the tag readers, wherein the identification indicator from the tag readers and the identification indicator from the database are associated with a same part number;
         detect removable component removal in response to detecting that the identification indicator from the database is missing from the tag readers:
         detect removable component addition in response to detecting that the identification indicator from the tag readers is missing from the database; and
         detect that no removable component addition, removal, or replacement was made in response to detecting that the identification indicator from the tag readers matches the identification indicators from the database.

2. The electromechanical device of claim 1, wherein the plurality of sectors comprises volumes in the electromechanical device in which the electronic identification tag may be detected by at least one of the tag readers.

3. The electromechanical device of claim 1, wherein the electronic identification tag and the plurality of tag readers are disposed to avoid signal occlusion.

4. The electromechanical device of claim 1, wherein the plurality of tag readers are to detect the electronic identification tag and signal strengths when the electromechanical device is in a semi-powered state.

5. A method for tracking removable components in electromechanical devices, comprising:
receiving, from a plurality of tag readers, identification indicators from electronic identification tags disposed at removable components of an electromechanical device and signal levels associated with one of the electronic identification tags;
identifying a location of a removable component in the electromechanical device based on the signal levels; and
detecting a change in the removable component based on a comparison of identification indicators from the plurality of tag readers with identification indicators from a database, the detecting comprising at least one from the set of:
detecting a removable component replacement in response to detecting that an identification indicator from the tag readers is missing in the database, and an identification indicator from the database is missing from the tag readers, wherein the identification indicator from the tag readers and the identification indicator from the database are associated with a same part number;
detecting a removable component removal in response to detecting that the identification indicator from the database is missing from the tag readers;
detecting a removable component addition in response to detecting that the identification indicator from the tag readers is missing from the database; and
detecting that no removable component addition, removal, or replacement was made in response to detecting that the identification indicators from the tag readers match the identification indicators from the database.

6. The method of claim 5, wherein reading, via the plurality of tag readers, the electronic identification tags is performed when the electromechanical device is in a semi-powered operating state wherein a processor of the electromechanical device is powered on and the electromechanical device is otherwise powered off.

7. The method of claim 5, wherein identifying the location of the removable component in the electromechanical device comprises:

generating a list of tag readers that detected the one of the electronic identification tags associated with the removable component;
receiving the signal levels associated with the one of the electronic identification tags at the removable component from the tag readers in the list;
comparing the signal levels from the tag readers to detect a sector for the removable component; and
identifying the location of the removable component based on the detected sector.

8. The method of claim 5, further comprising storing the location and the detected change and updating a time stamp associated with a maintenance for the electromechanical device.

9. A non-transitory machine-readable storage medium encoded with instructions executable by a processor, the non-transitory machine-readable storage medium comprising instructions to:
receive a plurality of identification indicators and signal levels corresponding to removable components in an electromechanical device;
identify a location of a removable component based on the signal levels corresponding to the removable component;
compare the identification indicators with a plurality of identification indicators in a database;
detect a removable component change in the electromechanical device based on the comparison, wherein to detect comprises at least one from the set of:
detect a removable component removal in response to detecting that the database contains an additional identification indicator with a different associated part number than the received plurality of identification indicators;
detect a removable component addition in response to detecting that an identification indicator from the electromechanical device is missing in the database; and
detect a removable component replacement in response to detecting that one of the plurality of identification indicators from the electromechanical device is missing in the database and a part number associated with the missing identification indicator matches a part number of a received identification indicator.

10. The non-transitory machine-readable storage medium of claim 9, further comprising instructions to:
generate a list of tag readers that detected an electronic identification tag associated with the removable component;
receive the signal levels associated with the electronic identification tag at the removable component from tag readers in the list of tag readers;
compare the signal levels from the tag readers to detect a sector for the removable component; and
identify the location of the removable component based on the detected sector.

* * * * *